United States Patent
Muto

(10) Patent No.: US 8,423,220 B2
(45) Date of Patent: Apr. 16, 2013

(54) CONTROL SYSTEM FOR SERIES-TYPE HYBRID VEHICLE

(75) Inventor: Hiroaki Muto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 260 days.

(21) Appl. No.: 13/052,639

(22) Filed: Mar. 21, 2011

(65) Prior Publication Data

US 2012/0095630 A1   Apr. 19, 2012

(30) Foreign Application Priority Data

Oct. 15, 2010 (JP) .................................. 2010-232463

(51) Int. Cl.
*B60W 20/00* (2006.01)

(52) U.S. Cl.
USPC ........................ 701/22; 180/65.21; 180/65.245

(58) Field of Classification Search ............. 701/22, 701/114, 54; 180/65.2, 65.275, 65.265, 65.27, 180/65.28, 65.285, 65.245, 65.1; 903/930, 903/907, 916, 918, 945, 902; 290/400; 318/139
See application file for complete search history.

(56) References Cited

U.S. PATENT DOCUMENTS 7,631,710 B2 *  12/2009  Utsumi .................... 180/65.21
2007/0112483 A1 *  5/2007  Jeong ............................ 701/22

FOREIGN PATENT DOCUMENTS

| JP | 2002-285905 A | 10/2002 |
| JP | 2004-208368 A | 7/2004 |
| JP | 2006-132391 A | 5/2006 |

* cited by examiner

Primary Examiner — Marthe Marc-Coleman
(74) Attorney, Agent, or Firm — Sughrue Mion, PLLC

(57) ABSTRACT

There are provided a hybrid control unit, an engine control unit that controls an engine based on command information received from the hybrid control unit and an operation status of the engine, and a communication abnormality detection means that detects an abnormality in communication between the hybrid control unit and the engine control unit. In the case where due to an abnormality in the communication between the hybrid control unit and the engine control unit, the engine control unit cannot receive command information from the hybrid control unit, each of the hybrid control unit and the engine control unit performs control in preliminarily set sequence.

2 Claims, 8 Drawing Sheets

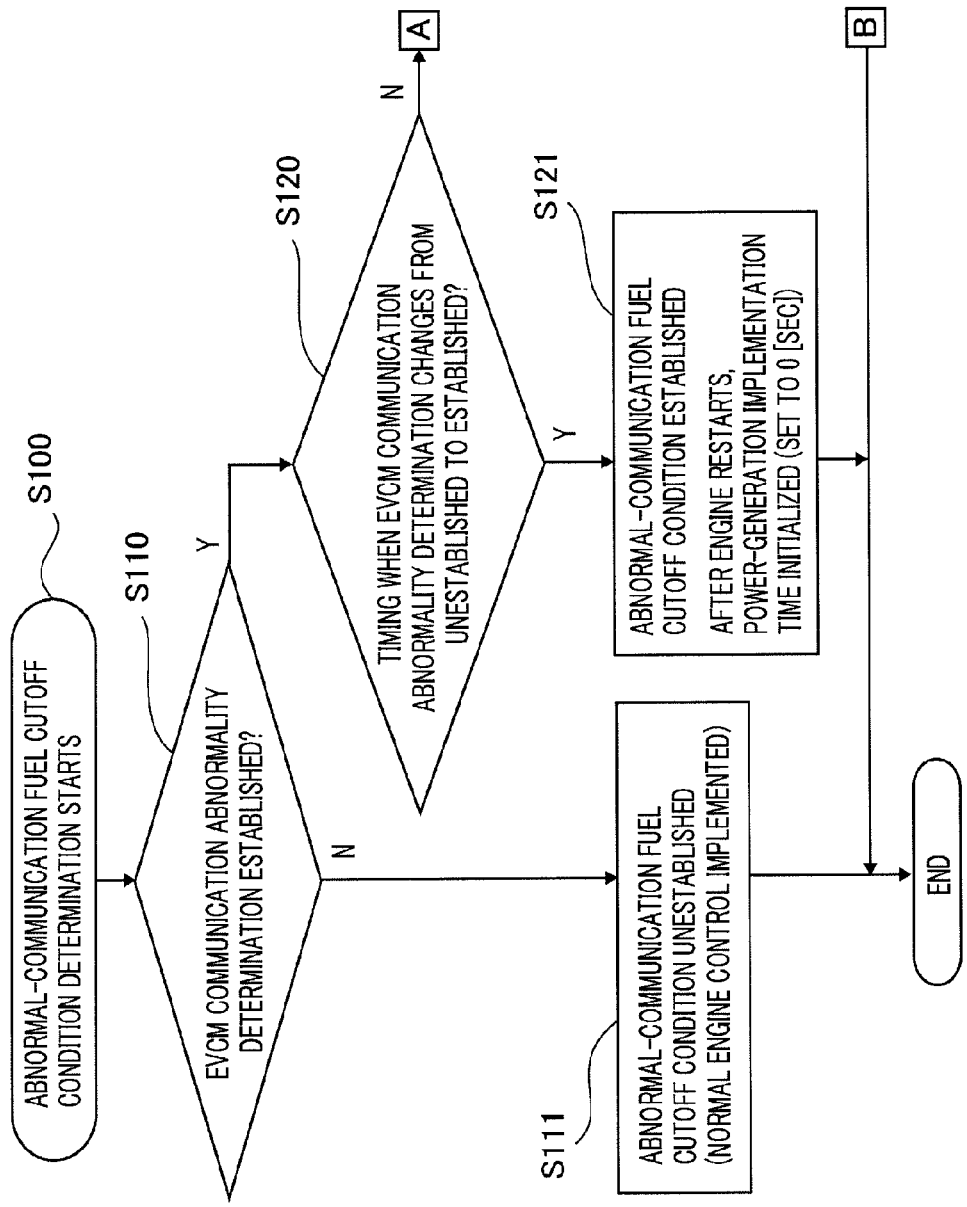

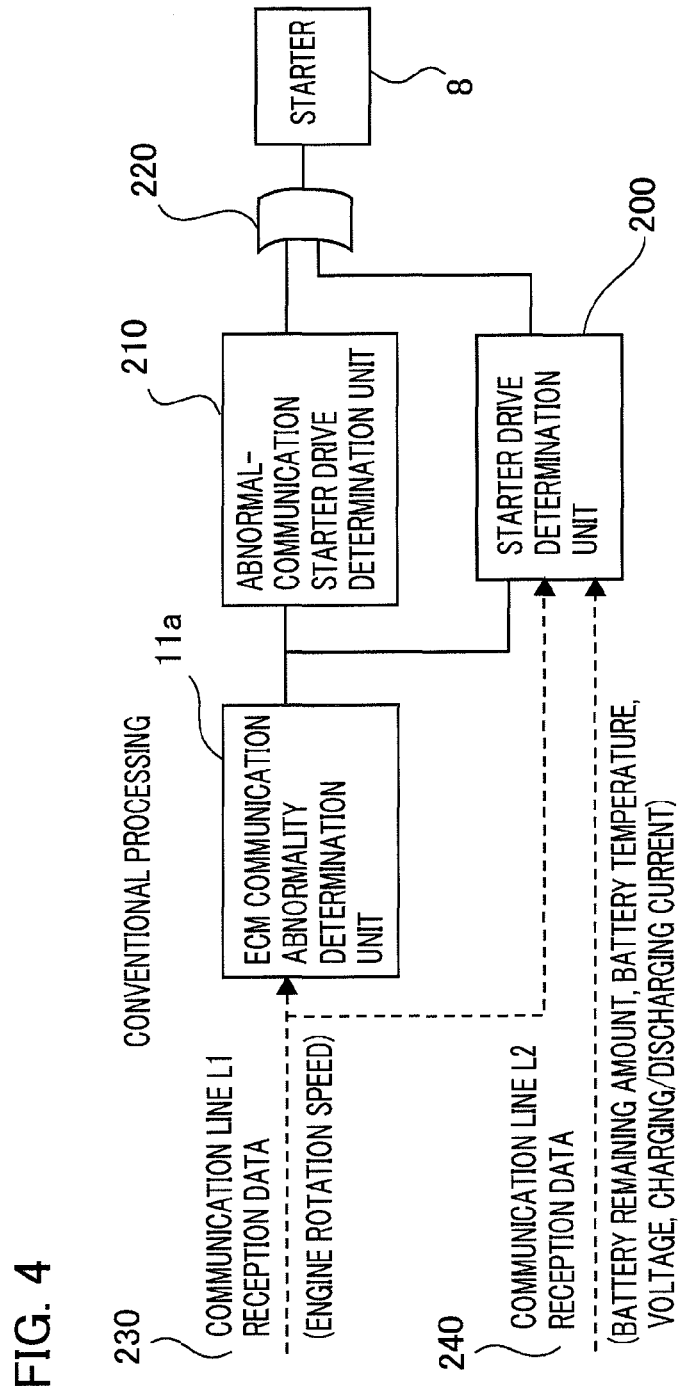

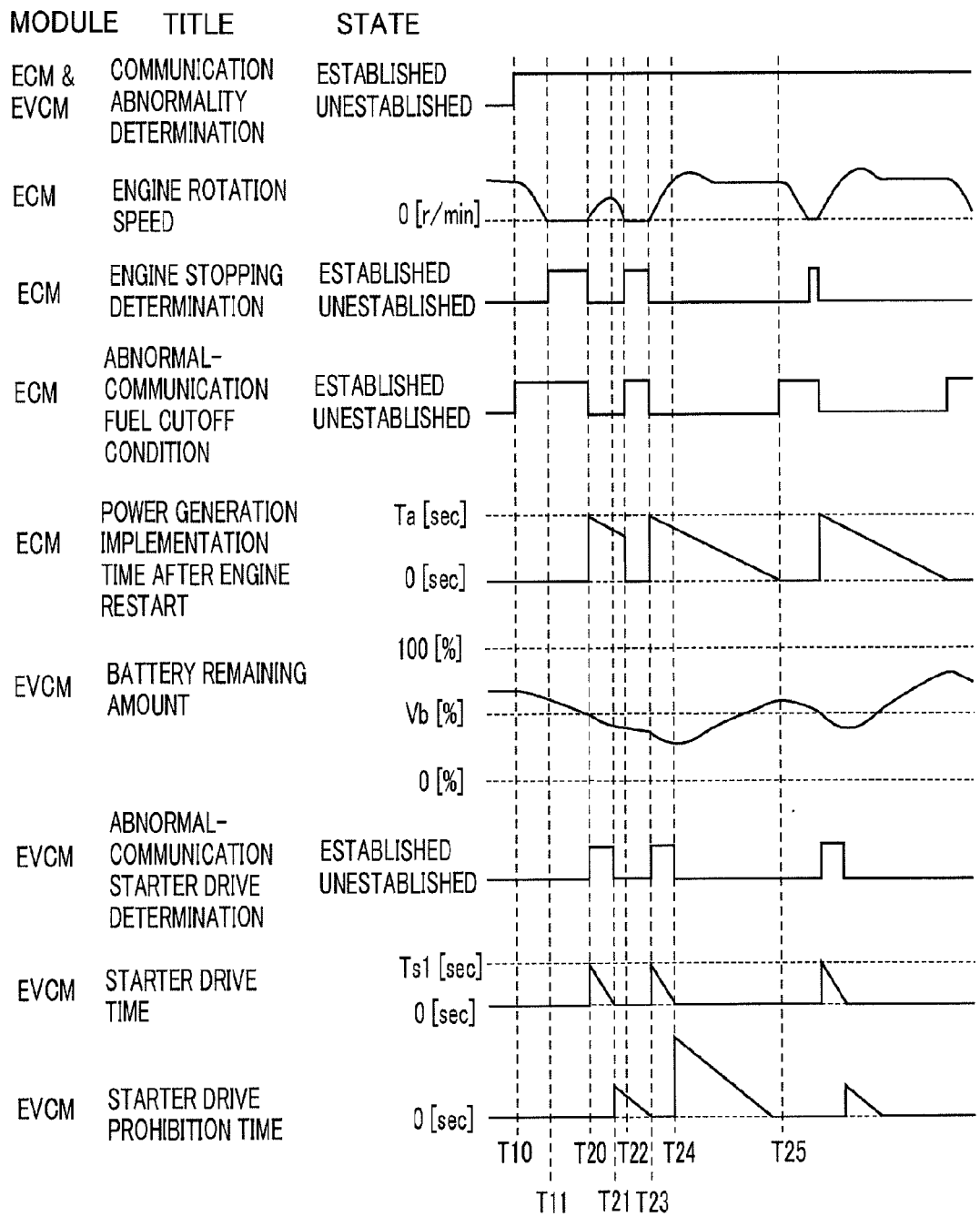

CONTROL SYSTEM FOR SERIES-TYPE HYBRID VEHICLE

BACKGROUND OF THE INVENTION

1. Field of the Invention

The present invention relates to a control system, for a series-type hybrid vehicle, that makes an electric motor drive a vehicle by use of an internal combustion engine for generating electric power.

2. Description of the Related Art

In general, in a series-type hybrid vehicle, there is mounted an electric motor as a driving force source for a vehicle. This electric motor is supplied with electric power from a battery, and the battery is charged with the output of an electric power generator. Then, this electric power generator is driven by a relatively small internal combustion engine (engine).

This kind of vehicle is controlled by an electronic control system. Speaking in detail, in a vehicle, there are provided a hybrid control unit that controls an electric power generator and an electric motor and an engine control unit that controls an engine; these control units manage and control each other based on a signal for detecting an operation status of the vehicle. For example, in the case where the engine is driven, the hybrid control unit calculates a requested engine output based on a battery status or the like and outputs it to the engine control section. Then, the engine control unit controls a fuel injection amount for satisfying the requested engine output (e.g., refer to Japanese Patent Application Laid-Open No. 2006-132391).

In a hybrid vehicle control system disclosed in Japanese Patent Application Laid-Open No. 2006-13239, a plurality of electronic control units that controls two or more respective constituent elements of a vehicle are configured to be capable of transmitting information to one another by way of a communication line, and by use of transmitted information from the other control units, each of the plurality of electronic control units performs collaborative control. Specifically, there is provided a hybrid control unit that calculates an engine output value for making an electric motor and an engine operate in a collaborative manner, while controlling the electric motor; the hybrid control unit transmits an engine output command value to the engine control unit that controls the engine, by way of the communication line. In response to the engine output command value, the engine control unit calculates control amounts such as a throttle opening degree, a fuel injection amount, and an ignition timing, and optimally controls the engine, based on the control amounts.

However, in the hybrid vehicle control system disclosed in Japanese Patent Application Laid-Open No. 2006-13239, in the case where there occurs an abnormality in the communication system between the engine control unit and the hybrid control unit, the engine control unit cannot receive information such as a requested engine rotation speed from the hybrid control unit; therefore, power generation torque that can maintain the operation of the system cannot be detected. As a result, because there occurs a difference between an actual power consumption and a generated electric power, there may be caused a case where the battery is excessively charged or excessively discharges electricity.

Accordingly, there has been proposed a technology that provides measures for raising the safety in travel by a vehicle and reducing the risk of causing damage to the electric system, in the case where there occurs an abnormality in the communication system between the engine control unit and the hybrid control unit (e.g., refer to Japanese Patent Application Laid-Open No. 2004-208368 and Japanese Patent Application Laid-Open No. 2002-285905).

In Japanese Patent Application Laid-Open No. 2004-208368, when an abnormality occurs in the communication system, the hybrid control unit makes the motor output torque to be zero and implements magnetic-field weakening control when the engine (motor) rotation speed is higher than a set speed; when the engine rotation speed is lower than the set speed, the engine control unit controls the engine in such a way that the engine rotation speed does not exceed the upper limit; when the engine rotation speed is higher than the set speed, the engine control unit controls the engine in such a way that there is produced target engine torque with which the engine rotation speed becomes lower than the upper limit; after the engine rotation speed has become lower than the upper limit, the engine control unit controls the engine in such a way that the engine rotation speed does not exceed the upper limit.

In Japanese Patent Application Laid-Open No. 2002-285905, when an abnormality occurs in the communication system, the engine control unit selects the present operation status and the target state of a vehicle from a plurality of operation statuses of the vehicle preliminarily set based on a plurality of control parameters, and stepwise selects, based on a predetermined priority, an appropriate transition path from a plurality of transition paths through which the operation state of the vehicle is moved from the present operation status to the target state; then, the engine control unit controls the engine in accordance with the selected transition path.

However, the technologies disclosed in Japanese Patent Application Laid-Open No. 2004-208368 and Japanese Patent Application Laid-Open No. 2002-285905 are the ones that are applied to a parallel-type hybrid vehicle that utilizes both an internal combustion engine and an electric motor, as a driving power source for the vehicle; therefore, application of the foregoing technologies to a series-type hybrid vehicle poses the following problems.

In the case where the technology disclosed in Japanese Patent Application Laid-Open No. 2004-208368 is utilized and an abnormality occurs in the communication between the engine control unit and the hybrid control unit while the engine is driven, when the engine control unit does not have any means for detecting a wheel rotation speed or when the engine control unit cannot detect the wheel rotation speed due to a communication abnormality, the engine control unit cannot detect power generation torque that can maintain the operation of the system; therefore, there exists only a method in which power generation is continued while the engine is driven in such a way that the engine rotation speed does not exceed the upper limit or a method in which the engine is stopped so that power generation is stopped. In addition, once the engine is stopped, the engine and the electric motor do not rotate together in a series-type hybrid vehicle; therefore, the engine cannot be restarted.

As discussed above, when the engine control unit cannot detect the battery remaining amount or the vehicle power consumption, there is caused a difference between the actual power consumption and the electric power generated by the electric power generator; therefore, the battery may excessively be charged or may excessively discharge electricity. As a result, it becomes difficult to move the vehicle to an intended place, for example, to make the vehicle travel to a repair shop; moreover, there may be caused damage to the electric system for driving the electric motor in the vehicle, for example, the motor controlling unit may suffer damage due to an excessive voltage.

Additionally, in the case where the technology disclosed in Japanese Patent Application Laid-Open No. 2002-285905 is utilized, because based on a plurality of control parameters, the statuses of the engine and the electric motor are estimated in detail, the operation state of the vehicle can more appropriately move to the fail-safe mode; however, in fact, there has been a problem that in order to detect a plurality of control parameters, it is required to add sensor inputs or an estimation means and the logic and the software become complicated. Moreover, because there are two or more control parameters, it takes a long time to deal with them.

SUMMARY OF THE INVENTION

The present invention has been implemented in consideration of the foregoing problems; the objective thereof is to provide a control system, for a series-type hybrid vehicle, that performs collaborative control of a plurality of constituent elements mounted in a hybrid vehicle and enables fail-safe travel in which the vehicle autonomously moves to an intended place, in the case where an abnormality occurs in the information transmission among the constituent elements.

A control system for a series-type hybrid vehicle, according to the present invention controls a series-type hybrid vehicle; the control system includes an electric motor that drives a vehicle to travel; a battery that supplies electric power to the electric motor; an electric power generator that charges the battery; an engine that drives the electric power generator; a starter that makes the engine start; a hybrid control unit that controls the electric motor based on a charging status of the battery and a traveling status of the vehicle and that controls the starter based on an operation status of the engine and the charging status of the battery; an engine control unit that controls the engine based on command information received from the hybrid control unit and the operation status of the engine; and a communication abnormality detection means that detects an abnormality in communication between the hybrid control unit and the engine control unit. In the control system, in the case where due to an abnormality in the communication between the hybrid control unit and the engine control unit, the engine control unit cannot receive command information from the hybrid control unit, each of the hybrid control unit and the engine control unit performs control in preliminarily set sequence.

The control system for a series-type hybrid vehicle, according to Embodiment 1 makes it possible that in the case where an abnormality occurs in the information transmission among the constituent element control units, there is implemented fail-safe travel in which the vehicle is moved to an intended place in an autonomous mode.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIGS. 3A and 3B are a set of flowcharts representing the operation of an engine control unit for a series-type hybrid vehicle, according to Embodiment 1 of the present invention;

FIG. 4 is a block diagram of a hybrid control unit for a series-type hybrid vehicle, according to Embodiment 1 of the present invention;

FIG. 7 is a timing chart representing the operation of an engine control unit for a series-type hybrid vehicle, according to Embodiment 1 of the present invention.

DETAILED DESCRIPTION OF THE PREFERRED EMBODIMENTS

Hereinafter, with reference to the accompanying drawings, there will be explained a preferred embodiment of a control system for a series-type hybrid vehicle, according to the present invention. The present invention is not limited to this embodiment but includes various kinds of design modifications.

Embodiment 1

Figure 1:
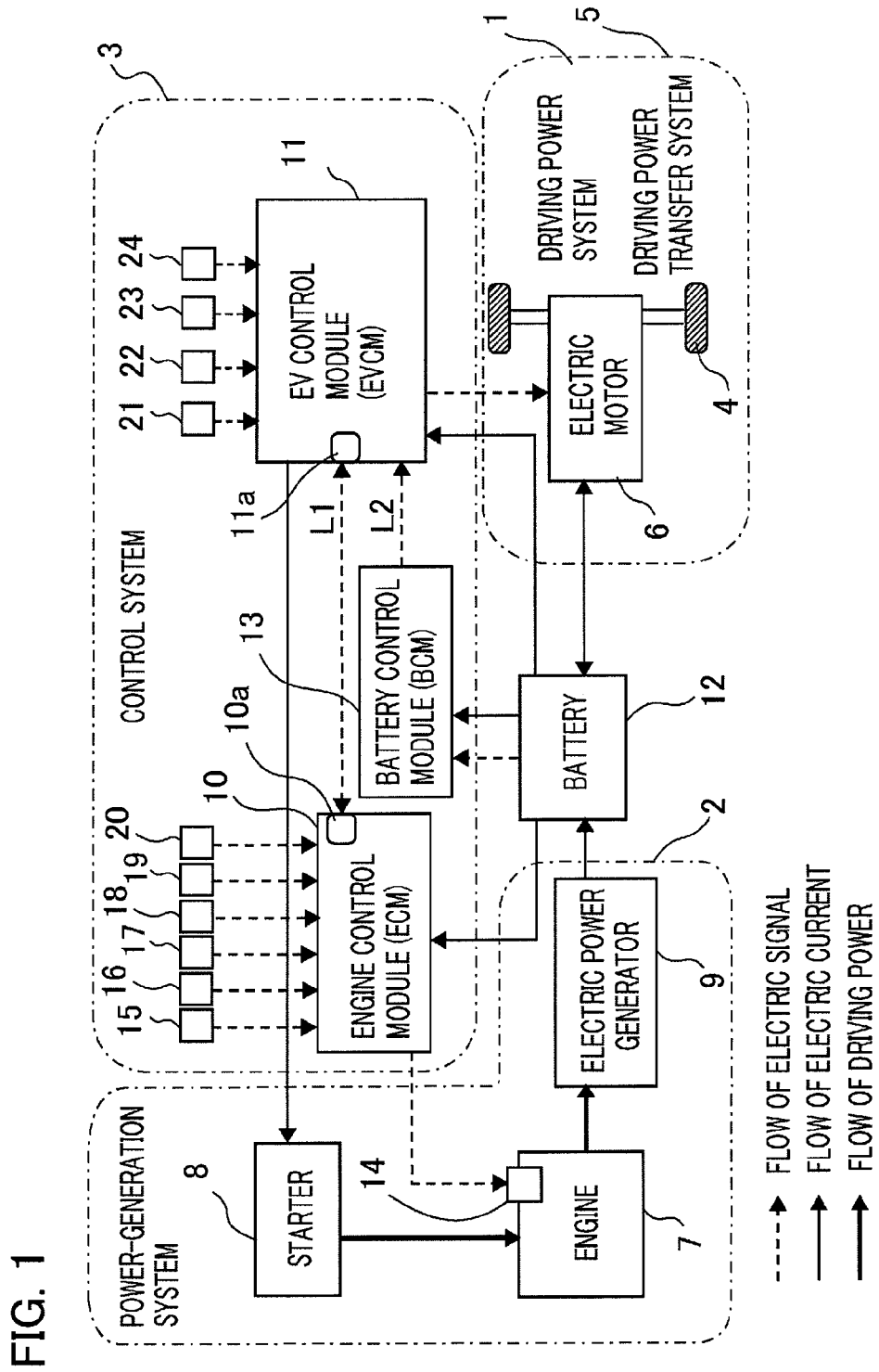
FIG. 1 is a configuration diagram for explaining a control system for a series-type hybrid vehicle, according to Embodiment 1 of the present invention.

FIG. 1 is a configuration diagram for explaining a control system for a series-type hybrid vehicle, according to Embodiment 1 of the present invention. The hybrid vehicle is configured mainly with a driving power system unit 1 that generates driving force, a power-generation system unit 2 that generates electric power, a control system unit 3 that controls the driving power system unit 1 and the power-generation system unit 2, a driving power transfer system unit 5 that transfers driving force from a driving power source to drive wheels 4, and the like.

The driving power system unit 1 is formed of an electric motor 6; the power-generation system unit 2 is configured with an engine 7, a starter 8, and an electric power generator 9. The control system unit 3 is configured with an engine control module (referred to as an ECM, hereinafter) 10, which is an engine control unit for controlling mainly the engine 7; an EV control module (referred to as an EVCM, hereinafter) 11, which is a hybrid control unit for controlling mainly the electric motor 6; a battery control module (referred to as a BCM, hereinafter) 13 that receives necessary information from a battery 12 and a sensor (unillustrated) mounted on the battery 12 and output the information to the EVCM 11; and various kinds of sensors that detect signals required by ECM 10 and EVCM 11 and input and output the signals.

The internal configurations of ECM 10, EVCM 11, and BCM 13 are not illustrated; however, ECM 10, EVCM 11, and BCM 13 are each equipped with a one-chip microcomputer having a CPU, a ROM, a RAM, and the like; they are each configured in such a way that a CPU therein performs various kinds of control processing items described later, in accordance with a program recorded in a ROM. The control system for a series-type hybrid vehicle, according to Embodiment 1 is configured with ECM 10 and EVCM 11.

In Embodiment 1, there are provided the starter 8 and the electric power generator 9; however, it may be allowed to utilize a motor generator having the respective functions of the starter 8 and the electric power generator 9.

ECM 10 controls the operation of the engine 7. The control of the engine 7 performed by ECM 10 includes electronic-throttle control in accordance with a power-generation amount, ignition-timing control in accordance with the rotation speed of the engine 7, fuel injection amount/fuel injection timing control for driving an injector 14 in accordance with an air-intake amount, and the like. In order to make it possible to control the engine 7, ECM 10 is connected with various kinds of sensors such as an engine rotation sensor 15 that indicates the operation status of the engine 7, an engine coolant temperature sensor 16, a throttle opening degree sensor 17, an air-intake amount sensor 18, an air-intake temperature sensor 19, and an intake pipe pressure sensor 20. The electric power generator 9, which rotates in synchronization with the rotation of the engine 7, is mounted on the engine. The torque of the starter 8 enables the engine 7 to start.

The electric motor 6 is electrically connected with the battery 12 and EVCM 11 and performs switching between the control in which the electric motor 6 makes the electric power supplied from the battery 12 drive the drive wheels 4, in response to a command from EVCM 11, and the control in which the electric motor 6 obtains regenerative electric power from the driving power of the drive wheels 4 so as to charge the battery 12.

The sensors and switches connected with EVCM 11 include an accelerator position sensor 21, a brake switch 22, a shift switch 23, a vehicle speed sensor 24, and the like. EVCM 11 communicates with ECM 10 and BCM 13 by way of a communication line L1 and a communication line L2, respectively. Information items transmitted from EVCM 11 to ECM 10 include a request for start/stop of the engine 7, a requested power generation amount, and the like; information items from ECM 10 to EVCM 11 include engine rotation speed information and the like. With regard to the communication between ECM 10 and EVCM 11, in order to monitor at the respective units as to whether or not communication is normal, an EVCM communication abnormality determination unit 10a is provided in ECM 10, and an ECM communication abnormality determination unit 11a is provided in EVCM 11. Moreover, information items transmitted from BCM 13 to EVCM 11 include a battery voltage, a battery remaining amount, a battery temperature, a charging/discharging current, and the like.

BCM 13 is electrically connected with the battery 12 and receives the battery voltage, the battery temperature, and the charging/discharging current amount. BCM 13 also calculates the battery remaining amount from these information items.

The control system for a series-type hybrid vehicle, according to Embodiment 1 is configured in such a way as described above. Next, with reference to FIG. 2, there will be explained drive processing on the injector 14 performed by ECM 10.

Figure 2:
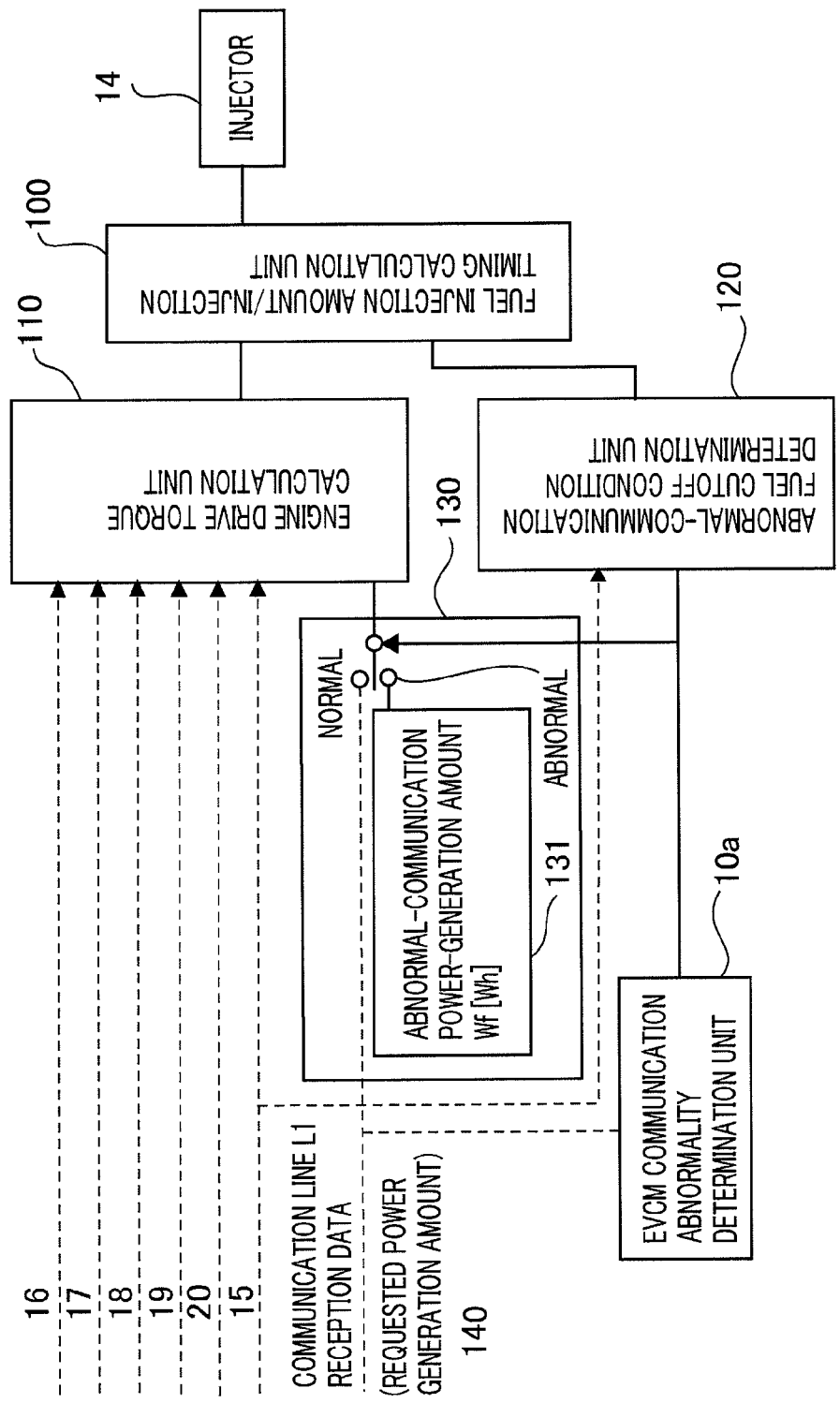
FIG. 2 is a block diagram of an engine control unit for a series-type hybrid vehicle, according to Embodiment 1 of the present invention.

FIG. 2 illustrates a block diagram of ECM 10; the injector is driven based on a calculation by a fuel injection amount/injection timing calculation unit 100. In this situation, the fuel injection amount/injection timing calculation unit 100 injects a fuel corresponding to engine drive torque calculated by an engine drive torque calculation unit 110, in synchronization with the rotation of the engine 7; however, in the case where an abnormal-communication fuel cutoff condition determination unit 120, which performs a determination on fuel cutoff condition when communication is abnormal, implements the determination, the fuel injection amount/injection timing calculation unit 100 forcibly stops fuel injection.

The determination of the fuel cutoff condition by the abnormal-communication fuel cutoff condition determination unit 120 is established when the EVCM communication abnormality determination unit 10a, which determines an abnormality in communication with EVCM 11, determines an abnormality in communication and a predetermined condition including the result of detection by the engine rotation sensor 15 is satisfied. The detail of the determination of the condition will be explained with reference to the flowcharts in FIGS. 3A and 3B.

The engine drive torque calculation unit 110 calculates engine drive torque in accordance with the operation status of the engine 7 based on the results of detections by the engine coolant temperature sensor 16, the throttle opening degree sensor 17, the air-intake amount sensor 18, the air-intake temperature sensor 19, the intake pipe pressure sensor 20, the engine rotation sensor 15, and the like and the result of calculation by a power-generation amount calculation unit 130.

In the case where the result of determination by the EVCM communication abnormality determination unit 10a is "normal", the power-generation amount calculation unit 130 outputs communication line L1 reception data (a requested power generation amount) 140 received from EVCM 11; in the case where the result of determination by the EVCM communication abnormality determination unit 10a is "abnormal", the power-generation amount calculation unit 130 outputs an abnormal-communication power-generation amount Wf [Wh] 131. Here, because the power consumption of the electric motor 6 fluctuates depending on the traveling status of the vehicle, the abnormal-communication power-generation amount Wf [Wh] 131 is preliminarily set in such a way as to become larger than the electric power (the maximum power consumption) consumed in the traveling state in which when the EVCM communication abnormality determination unit 10a determines an abnormality in communication, the load becomes the maximum load.

The EVCM communication abnormality determination unit 10a determines an abnormality when an abnormality is determined by a parity check on the communication line L1 reception data 140 or when the reception data is not received for more than a set time.

Next, the flow of the fuel cutoff condition determination by the abnormal-communication fuel cutoff condition determination unit 120 will be explained with reference to the flowcharts in FIGS. 3A and 3B.

The fuel cutoff condition determination by the abnormal-communication fuel cutoff condition determination unit 120 is processing that is periodically implemented every constant time; when the abnormal-communication fuel cutoff condition determination is started in ECM 10 (the step S100), it is determined whether or not the EVCM communication abnormality determination has been established (the step S110); in the case where the EVCM communication abnormality determination by the EVCM communication abnormality determination unit 10a has not been established, the abnormal-communication fuel cutoff condition determination is regarded as being not established, and then normal engine control is implemented (the step S111).

In the case where the EVCM communication abnormality determination by the EVCM communication abnormality determination unit 10a has been established, at first, the abnormal-communication fuel cutoff condition determination is established so as to stop fuel injection control at the timing the EVCM communication abnormality determination changes from being not established to being established (the step S120), and after the engine has restarted, a power-generation implementation time is initialized (0 [sec]) (the step S121).

When the present timing is not the timing when the EVCM communication abnormality determination by the EVCM communication abnormality determination unit 10a changes from being not established to being established, it is determined whether or not an engine stopping determination at the present processing timing has been established (the step S130); in the case where the engine stopping determination at the present processing timing has been established, the power-generation implementation time is initialized (0 [sec]) after the engine has restarted (the step S131). In this situation, the engine stopping determination is a determination on a condition, which is established when the engine 7 has completely stopped.

Next, when the engine stopping determination at the present processing timing has not been established, it is determined whether or not the engine stopping determination at the immediately previous processing timing has been established (the step S140); in the case where the engine stopping determination at the immediately previous processing timing has been established, the power-generation implementation time is set to a predetermined value Ta [sec] after the engine has restarted (the step S141).

In this situation, after the engine has restarted, the power-generation implementation time Ta is set to a time in which the battery remaining amount does not exceed 100[%] (the fully charged state) when the vehicle is being supplied with regenerative electric power and electric power is generated with the abnormal-communication power-generation amount Wf [Wh] 131.

In the case where the engine stopping determinations at the immediately previous and the present processing timings have not been established, the fuel injection control is being implemented (electric power is being generated); therefore, after the engine has restarted, the power-generation implementation time is reduced to 0 [sec] every predetermined time (the step S142).

At last, after the engine has restarted, it is determined whether or not the length of the power-generation implementation time has exceeded Ta [sec] (the step S150); in the case where the length of the power-generation implementation time has exceeded Ta [sec], the abnormal-communication fuel cutoff condition determination by the abnormal-communication fuel cutoff condition determination unit 120 is established so that the fuel injection control is stopped (the step S151). In the case where the length of the power-generation implementation time has not exceeded Ta [sec], the fuel injection control is being implemented; thus, the abnormal-communication fuel cutoff condition determination is left unestablished (the step S152).

Next, with reference to FIG. 4, there will be explained drive processing on the starter 8 performed by EVCM 11.

FIG. 4 illustrates a block diagram of EVCM 11; the drive determination on the starter 8 is implemented based on a logical sum 220 of a starter drive determination in a starter drive determination unit 200 and an abnormal-communication starter drive determination in an abnormal-communication starter drive determination unit 210. Here, the starter drive determination by the starter drive determination unit 200 is established when it is determined that it is required to restart the engine 7 and the battery 12 is charged, based on information items such as communication line L1 reception data (engine rotation speed) 230 and communication line L2 reception data (the battery remaining amount, the battery temperature, the voltage, the charging/discharging current amount) 240. In the case where the ECM communication abnormality determination by the ECM communication abnormality determination unit 11a is established, information of the communication line L1 reception data (engine rotation speed) 230 cannot be received; thus, starter drive determination by the starter drive determination unit 200 is unestablished.

The abnormal-communication starter drive determination by the abnormal-communication starter drive determination unit 210 is a determination on a condition that is established in the case where a predetermined condition is satisfied when the ECM communication abnormality determination by the ECM communication abnormality determination unit 11a is established. The detail of the determination of the condition will be explained with reference to the flowcharts in FIGS. 5 and 6.

In the ECM communication abnormality determination by the ECM communication abnormality determination unit 11a, it is determined that an abnormality exists in the ECM communication, when an abnormality is determined by a parity check on the communication line L1 reception data 230 or when the reception data is not received for more than a set time.

Next, the flow of the abnormal-communication starter drive determination by the abnormal-communication starter drive determination unit 210 will be explained with reference to the flowcharts in FIGS. 5 and 6.

The abnormal-communication starter drive determination by the abnormal-communication starter drive determination unit 210 is processing that is periodically implemented every constant time; when the abnormal-communication starter drive determination is started in EVCM 11 (the step S200), it is determined whether or not, the ECM communication abnormality determination by the ECM communication abnormality determination unit 11a has been established (the step S210); in the case where the ECM communication abnormality determination by the ECM communication abnormality determination unit 11a has not been established, the abnormal-communication starter drive determination is unestablished; then, the starter drive time and the starter drive prohibition time are initialized (0 [sec]) (the step S211).

Only in the case where the ECM communication abnormality determination has been established, the battery remaining amount is the same as or smaller than a predetermined value (Vb [%]) (the step S220), the abnormal-communication starter drive determination by the abnormal-communication starter drive determination unit 210 has been unestablished (the step S230), and the length of the starter drive prohibition time has exceeded Ts2 [sec] (the step S240), the abnormal-communication starter drive determination is unestablished; then, the starter drive time is set to Ts1 [sec] (the step S241).

Subsequently, only in the case where the abnormal-communication starter drive determination by the abnormal-communication starter drive determination unit 210 has been established (the step S250) and the length of the starter drive time has exceeded Ts1 [sec] (the step S260), the abnormal-communication starter drive determination is unestablished; then, the starter drive prohibition time is set to Ts2 [sec] (the step S261).

Lastly, the starter drive time and the starter drive prohibition time are reduced to 0 [sec] every predetermined time (the step S262).

Here, there will be described the method of setting the battery remaining amount Vb [%]. When the battery remaining amount is reduced, it is required to charge the battery 12 by means of the engine 7 in order to secure the electric power necessary to maintain the system; however, the electric power for restarting the engine 7 by means of the motor 8 should be held. In addition, it is conceivable that the engine 7 fails in restarting; thus, the battery remaining amount is set in consideration of the foregoing matter.

The starter drive time Ts1 [sec] is set to a time that is longer than the time from a time point when the drive of the starter 8 is started to a time point when the engine 7 restarts.

Next, in order to prevent the engine 7 for failing in restarting, as the starter drive prohibition time Ts2 [sec], there is calculated a time from a time point when the battery remaining amount is the amount at a time when the abnormal-communication starter drive determination by the abnormal-communication starter drive determination unit 210 is established to a time point when the battery remaining amount exceeds Vb [%] in the case where the electric motor 6 consumes the maximum electric power at a time when the communication is abnormal and the engine 7 generates electric power with the abnormal-communication power-generation amount Wf [Wh] 131.

Figure 3B:
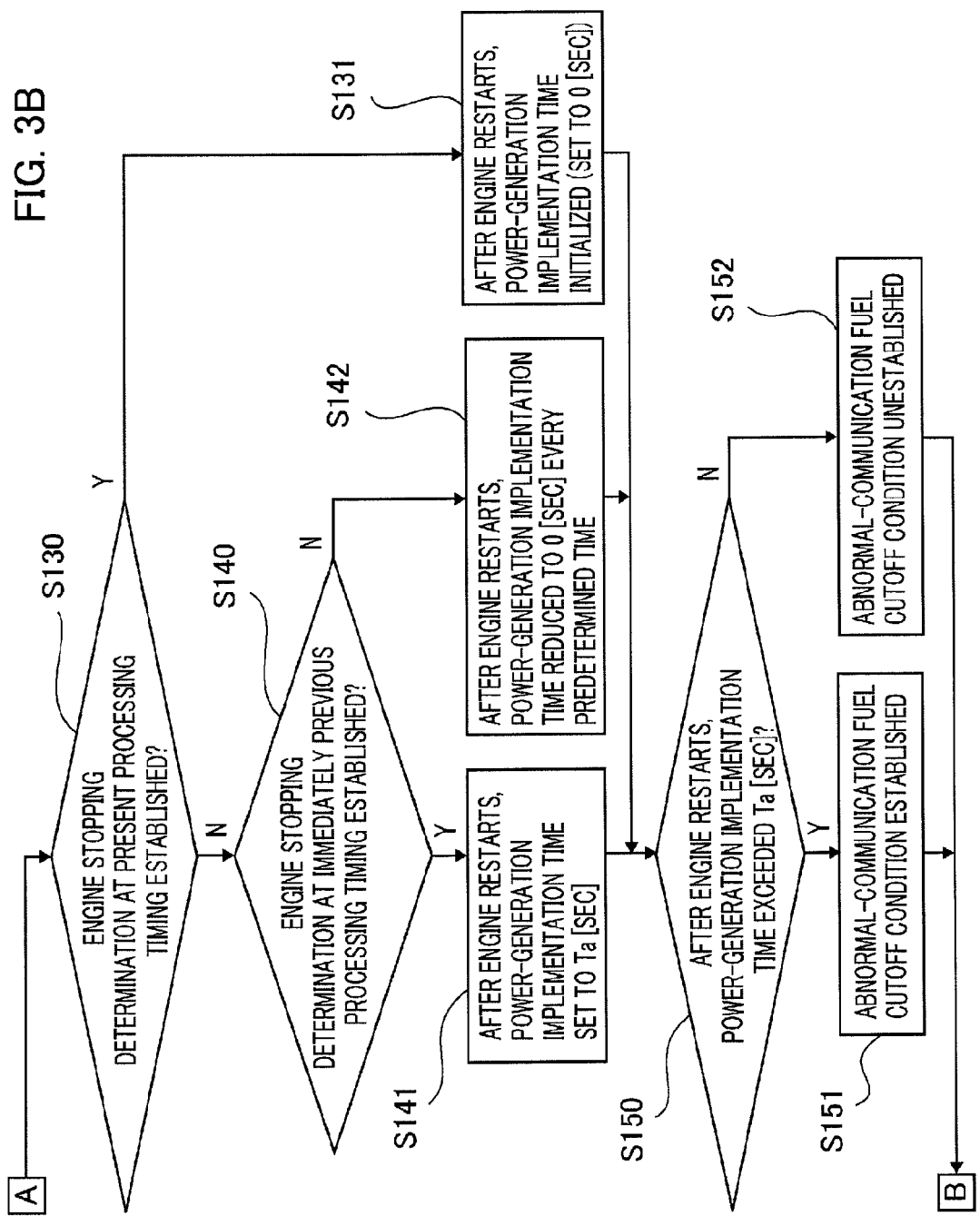
Figure 5:
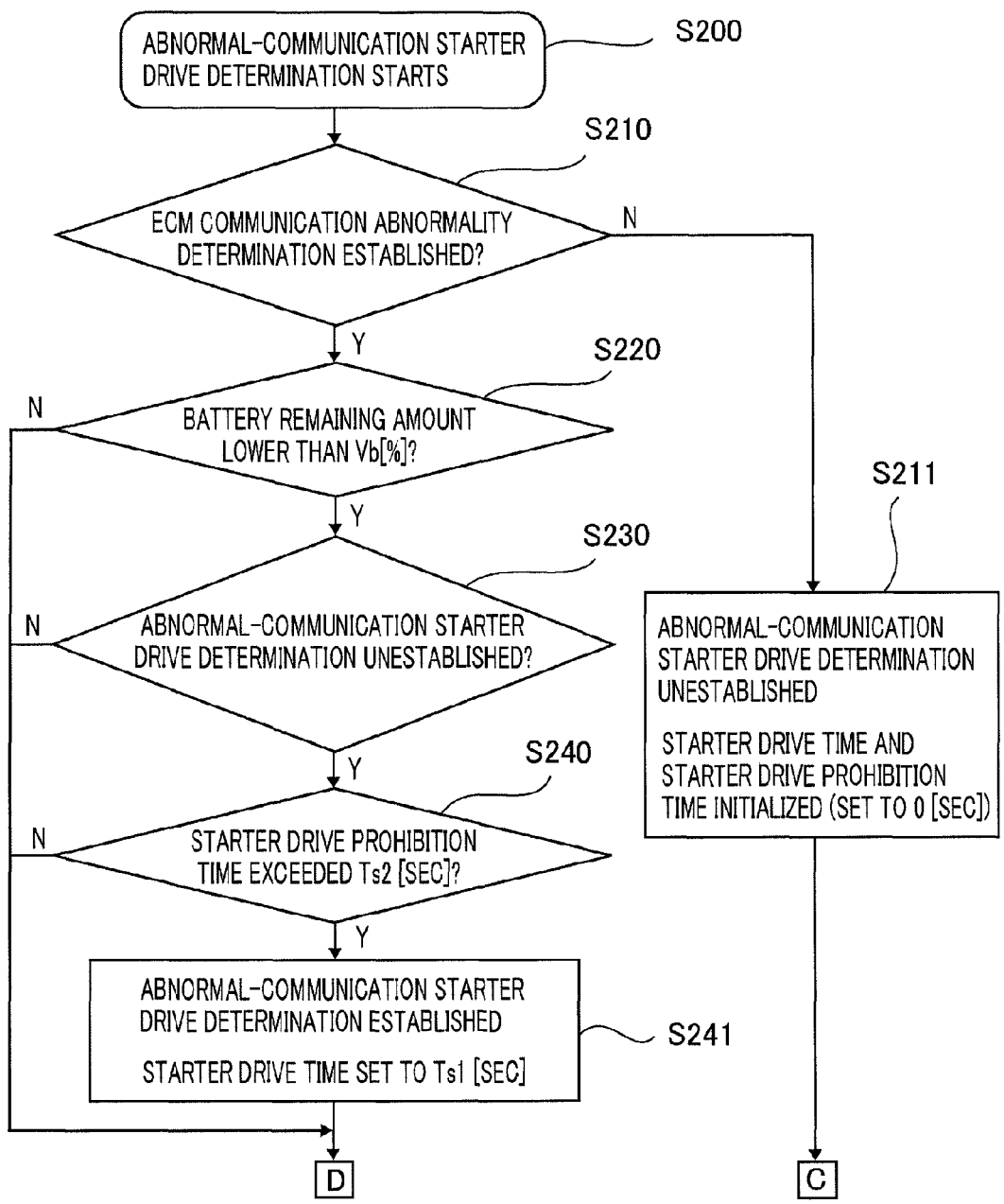
FIG. 5 is a flowchart representing the operation of a hybrid control unit for a series-type hybrid vehicle, according to Embodiment 1 of the present invention.
Figure 6:
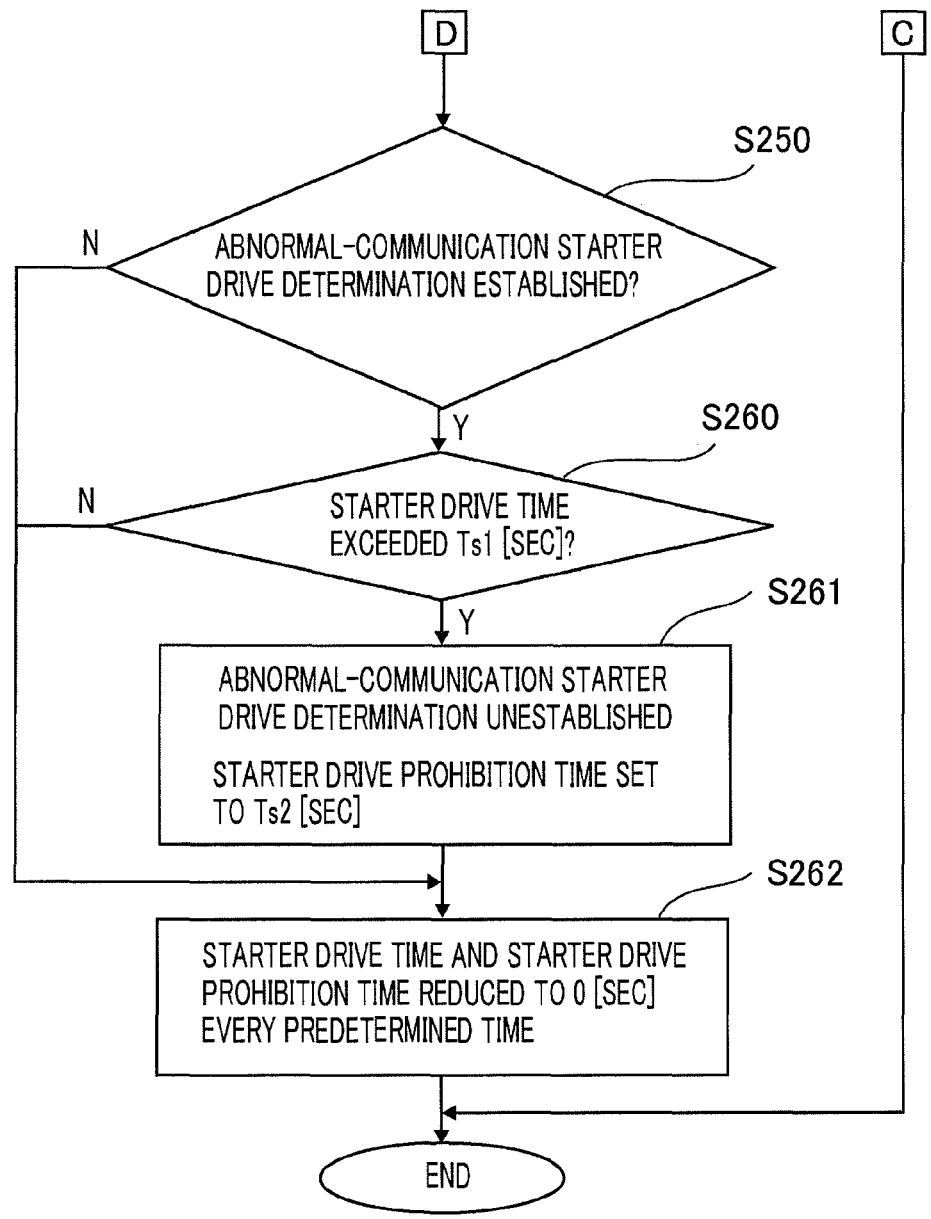
FIG. 6 is a flowchart representing the operation of a hybrid control unit for a series-type hybrid vehicle, according to Embodiment 1 of the present invention.

Next, with reference to the timing chart in FIG. 7, there is explained a series of behaviors in which after the EVCM communication abnormality determination by the EVCM communication abnormality determination unit 10a, explained with reference to FIG. 2, and the ECM communication abnormality determination by the ECM communication abnormality determination unit 11a, explained with reference to FIG. 4, are established, the abnormal-communication fuel cutoff condition determination by the abnormal-communication fuel cutoff condition determination unit 120, explained with reference to FIGS. 3A and 3B, is established, and then the abnormal-communication starter drive determination by the abnormal-communication starter drive determination unit 210, explained with reference to FIGS. 5 and 6, is established.

At first, when the EVCM communication abnormality determination by the EVCM communication abnormality determination unit 10a is established, ECM 10 makes the abnormal-communication fuel cutoff condition determination by the abnormal-communication fuel cutoff condition determination unit 120 to be established (the timing T10).

In the case where when the EVCM communication abnormality determination by the EVCM communication abnormality determination unit 10a is established, the engine 7 has been driven, the engine rotation speed gradually decreases as represented in FIG. 7; then, when the engine 7 completely stops, the engine stopping determination is established (the timing T11). In the case where when the EVCM communication abnormality determination by the EVCM communication abnormality determination unit 10a is established, the engine 7 has stopped, the engine 7 is kept in the stop mode and the engine stopping determination is kept established.

In the case where after the ECM communication abnormality determination by the ECM communication abnormality determination unit 11a is established, it is determined that the battery remaining amount is the same as or smaller than Vb [%], the abnormal-communication starter drive determination by the abnormal-communication starter drive determination unit 210 is made to be established so that the starter 8 is driven (the timing T20).

After the starter drive time Ts1 [sec] elapses, the abnormal-communication starter drive determination by the abnormal-communication starter drive determination unit 210 is made to be unestablished so that the drive of the starter 8 is stopped (the timing T21). At this moment, the starter drive prohibition time is set to Ts2 [sec].

In the case where the restarting of the engine 7 fails, the engine rotation speed increases due to the driving force of the starter 8; however, when the drive of the starter 8 is stopped, the engine rotation speed gradually decreases; then, when the engine 7 completely stops, ECM 10 makes the engine stopping determination to be established. At this moment, after the engine is restarted, the power-generation implementation time is initialized (0 [sec]), and the abnormal-communication fuel cutoff condition determination by the abnormal-communication fuel cutoff condition determination unit 120 is made to be unestablished (the timing T22).

In the case where after the starter drive prohibition time Ts2 [sec] elapses, it is determined that the battery remaining amount is the same as or smaller than Vb [%], EVCM 11 again makes the abnormal-communication starter drive determination by the abnormal-communication starter drive determination unit 210 to be established so that the starter 8 is driven (the timing T23). In addition, after the starter drive time Ts1 [sec] elapses, the abnormal-communication starter drive determination by the abnormal-communication starter drive determination unit 210 is made to be unestablished so that the drive of the starter 8 is stopped (the timing T21).

At this moment, the starter drive prohibition time is set to a time corresponding to the battery remaining amount at a time when at the timing T23, the abnormal-communication starter drive determination by the abnormal-communication starter drive determination unit 210 is established.

In the case where the restarting of the engine 7 succeeds, ECM 10 implements the fuel injection for the engine 7, in accordance with the engine drive torque calculation by the engine drive torque calculation unit 110 and the fuel injection amount/injection timing calculation by the fuel injection amount/injection timing calculation unit 100.

The engine 7 continues power generation with the abnormal-communication power-generation amount Wf [Wh] 131 until the power-generation implementation time Ta [sec] elapses; thus, as represented in FIG. 7, the decrease in the battery remaining amount stops.

At last, in the case where after the engine restarts, the power-generation implementation time Ta [sec] elapses, ECM 10 makes the abnormal-communication fuel cutoff condition determination by the abnormal-communication fuel cutoff condition determination unit 120 to be established so that the drive of the engine 7 is stopped (the timing T25).

After that, the process from the timing T20 to the timing T25 is repeated.

As described above, the control system for a series-type hybrid vehicle, according to Embodiment 1 makes it possible that in the case where an abnormality occurs in the information transmission among the constituent element control units, there is implemented fail-safe travel in which the vehicle is moved to an intended place, for example, autonomous travel to a repair shop is performed, and makes it possible that the state of the vehicle appropriately moves to the fail-safe mode, without providing damage to the electric system for driving the electric motor, without requiring addition of sensor inputs and addition of complicated logic and software, and without requiring a great number of corresponding man-hours.

Various modifications and alterations of this invention will be apparent to those skilled in the art without departing from the scope and spirit of this invention, and it should be understood that this is not limited to the illustrative embodiments set forth herein.

What is claimed is:
1. A control system for a series-type hybrid vehicle, comprising:
    an electric motor that drives a vehicle to travel;
    a battery that supplies electric power to the electric motor;
    an electric power generator that charges the battery;
    an engine that drives the electric power generator;
    a starter that makes the engine start;

a hybrid control unit that controls the electric motor based on a charging status of the battery and a traveling status of the vehicle and that controls the starter based on an operation status of the engine and the charging status of the battery;

an engine control unit that controls the engine based on command information received from the hybrid control unit and the operation status of the engine; and a communication abnormality detection means that detects an abnormality in communication between the hybrid control unit and the engine control unit, wherein in the case where due to an abnormality in the communication between the hybrid control unit and the engine control unit, the engine control unit cannot receive command information from the hybrid control unit, each of the hybrid control unit and the engine control unit performs control in preliminarily set sequence;

wherein in the sequence, the engine control unit stops drive of the engine and then the following operations (1) and (2) are repeated;

(1) the hybrid control unit drives the starter when the remaining amount of the battery decreases;

(2) the engine control unit makes the engine restart by means of the starter, and stops the drive of the engine after driving the engine for a preliminarily set time.

2. The control system for a series-type hybrid vehicle, according to claim 1, wherein instead of the starter and the electric power generator, there is provided a motor generator having the respective functions of the starter and the electric power generator.

* * * * *